United States Patent Office 3,396,037
Patented Aug. 6, 1968

3,396,037
PROCESS FOR THE MANUFACTURE
OF HARD BUTTER
Richard J. Bell, Robert L. Campbell, Jr., Paul Gibson, and Jay F. Sims, Sherman, Tex., assignors to Anderson, Clayton & Co., Sherman, Tex., a corporation of Delaware
No Drawing. Filed Aug. 11, 1964, Ser. No. 388,912
18 Claims. (Cl. 99—118)

ABSTRACT OF THE DISCLOSURE

Process for the manufacture of hard butter including rearranging lauric type oil or a mixture of at least 50% lauric type oil with certain other oils in the presence of a small amount of low temperature molecular rearrangement catalyst at temperatures below about 240° F., at a pressure less than about 50 mm. Hg abs., and for a time in excess of 30 minutes thereafter, deactivating the catalyst by the addition of an acid to form an anhydrous salt and removing the anhydrous salt by filtration.

---

Bakery and frozen products such as cookies, confections, and ice cream are often sold with a coating, principally chocolate flavored, which coating normally includes a fat called hard butter, cocoa powder, sugar, and lecithin. These coatings to be desirable in eating must have the taste characteristics of melting readily in the mouth, must not have a waxy feel, must not leave a waxy residue in the mouth, and must not mask the chocolate or other flavor. Additionally, such coatings need to have favorable performance characteristics which include hardening quickly and being resistant to the formation of "grey" or "bloom" on the gloss. The latter affects the appearance of coated products and often results in the customer's refusing to buy them.

The hard butter used in those coatings has a very marked influence on these taste and performance characteristics.

It is common in the manufacture of hard butter to use a lauric type oil or a mixture of lauric type oils and non-lauric type oils which have been subjected to various treatments. One of the methods of treating the lauric type oils and mixtures of lauric and non-lauric type oils, which is well known in the trade, includes the steps of:

(1) Heating the oil in an inert atmosphere to remove moisture and other material interfering with subsequent catalytic action while agitating the oil with mechanical means or inert gas.

(2) Random molecular rearrangement or interesterification of the oil by subjecting the oil in an all liquid state to an interesterification reaction at temperatures of about 200 to 240° F. in the presence of a small amount of low temperature catalyst under atmospheric conditions or under an inert atmosphere, such as nitrogen gas, at approximately atmospheric pressure.

(3) Deactivating the catalyst with water and, if desired, carbon dioxide upon completion of the random rearrangement.

(4) Recovering the treated oil, normally by (a) allowing water and soap to settle, (b) draining the water and soap, and (c) drying and deodorizing the oil with the deodorization including steam distillation in vacuo.

(5) Hydrogenation of the oil (hard butter) to the desired melting point. This hydrogenation may be carried out before or after the random rearrangement.

Step No. 2 above is referred to hereafter as conventional random rearrangement or interesterification. The process of steps 1 through 4 above with or without step 5 is referred to hereinafter as the conventional random rearrangement or interesterification process.

It is a general object of the present invention to provide a process for the manufacture of a hard butter which, when incorporated in a coating results in a coating which has the taste characteristics at least as favorable as those using hard butter made by the conventional random rearrangement process but with improved performance characteristics in that coatings made from such hard butter harden more quickly. Any reduction in time of hardening of such coatings is highly desired by manufacturers of those coatings and the products coated by them.

Another object of the present invention is to provide such a process in which interesterification takes place under high vacuum.

A still further object of the present invention is to provide such a process in which the catalyst used in interesterificaion is deactivated by the use of an acid and removed from the treated oil by filtration.

These and other objects will be apparent from the following description of the invention.

In the foregoing and in the remainder of this specification, the term "lauric type oil" means an edible oil such as coconut, palm kernel, babassu, tucum, and coquito, whose principal fatty acid constituent is lauric acid. The term "non-lauric type oil" means those edible oils whose principal fatty acid content is not lauric acid. Examples of non-lauric oils include the domestic vegetable oils, such as cottonseed oil, peanut oil, soybean oil, palm oil, sesame oil, safflower oil, and sunflower oil.

This invention is based upon the discovery that a hard butter giving a coating having a quick setting time results if (1) in the process of preparing hard butter from an edible oil containing at least about 50% lauric type oil and in which process (a) the oil is rearranged while being maintained at a temperature above that at which any solids form and with a small amount of metal methylate catalyst under molecular rearrangement conditions favorable to said catalyst, (b) the catalyst is thereafter inactivated, and (c) the treated oil is recovered, (2) the oil selected is either (a) a lauric type oil, (b) a mixture of lauric and nonlauric type oil, (c) a mixture of lauric type oil and methyl esters of a non-lauric type oil, (d) a mixture of lauric type oil and methyl esters of myristic, palmitic, or stearic acid, and (3) the treatment is carried out at temperatures below about 240° F. for longer than approximately 30 minutes at a pressure less than about 50 mm. Hg abs.

If less than 50% lauric type oil is used the coatings made from the resulting hard butter do not have favorable performance characteristics. The methyl esters of myristic, palmitic, and stearic acid are available commercially. The method of preparing methyl esters of a non-lauric type oil is well known in the art and no description of it is necessary.

The preferred pressure is below about 20 mm. Hg abs. Above about 50 mm. Hg abs. the decreased setting time is not present. The preferred temperature range is between 180 and 240° F. At temperatures appreciably above 240° F. the catalyst tends to decompose and the fat to polymerize causing unwanted side reactions. The time for modification is any time longer than about 30 minutes with 60 to 120 minutes being preferred.

Any catalyst which will work in a conventional random rearrangement may be used in the process of the present invention. Preferably the metal methylate rearrangement catalysts such as sodium methylate, potassium methylate, or aluminum methylate are used with the most preferred catalyst being sodium methylate. The catalysts which may be used in the process of the present invention are hereinafter referred to as low temperature rearrangement catalysts.

The process of the present invention includes deactivating the catalyst conventionally with water or a combination of water and carbon dioxide, but some soap is formed when the rearrangement is stopped by the introduction of water. This formation of soap not only represents a processing loss but also requires a rather extensive water washing to remove the soap prior to subsequent processing such as hydrogenation. A combination of water and carbon dioxide is also conventional and is intended to prevent soap formation. However, it has been found that in processing of larger batches water washing is still necessary as some soap will be formed.

In the present process the rearrangement takes place under such conditions of temperature and pressure that if a metal methylate catalyst is used it may be deactivated without the formation of soap by the addition of an acid such as phosphoric, citric, or tartaric to the rearranged oil. Phosphoric acid is preferred. The acid reacts with the metal methylate catalyst to form a salt which, if anhydrous, is insoluble in the oil and is easily removed by filtration. Because the acid will normally contain some water in solution this water must be removed or the salt formed will contain water of crystallization which will make the salt soluble in the oil. At the conditions of temperature and pressure at which the oil is rearranged under the process of the present invention the anhydrous salt is formed because the water added with the acid is removed. Normally about 15 to 30 minutes is required for the anhydrous salts to form under the temperature and pressure conditions of the interesterification as compared to 5 to 8 hours of time required to wash the treated oil in this and other processes if the catalyst is deactivated by water.

While the temperatures and catalysts used in the process of the present invention are the same as those used in conventional random rearrangement, applicants believe that the arrangement which takes place here under high vacuum results in a directed rather than a random rearrangement. Additionally, all the oil does not remain in a liquid phase during rearrangement at the high vacuum involved. During rearrangement, a certain portion of the liquid being rearranged is vaporized. This portion withdrawn as a vapor is not truly representative of the remainder of the liquid because of the difference in boiling points of the various constituents of the liquid. Applicants believe that it is because of directed rather than random rearrangement and/or the withdrawal of a certain portion during rearrangement of the liquid being rearranged that this quicker setting time occurs. However, applicants are not bound by such theory.

In the examples herein given in which comparisons are given between the coatings made from hard butter produced by the process of the present invention and hard butters made by the conventional random rearrangement process, the coating consisted of 30.5% hard butter, 69.3% dry ingredients (the dry ingredients being 11.6% cocoa butter, 11.6% non-fat dry milk solids, and 76.5% sugar, vanillin and salt) and 0.2% lecithin. The hard butter was weighed, melted at 140 to 150° F. over a water bath, and the lecithin added and mixed while holding the temperature between 140 and 150° F. About ⅓ of the liquid mixture of hard butter and lecithin was added to the dry ingredients in a mixing cup to make a thick paste. The remainder of the liquid hard butter and lecithin mixture was added slowly and mixed for approximately 90 minutes with agitation. After mixing the coating was cooled in a 70° F. water bath over a period of 20 to 30 minutes to its "mush point" which was about 3 to 5° F. below the melting point of the hard butter. After about 10 minutes at the "mush point" the temperature of the coating was slowly raised to within 1° F. of the hard butter melting point and held about 10 minutes at this temperature until the coating thinned. Food was then coated with this coating and placed in a cooling tunnel at 53±1° F. until the coating had hardened completely. During this setting period the surface of the coated material was checked for the "incipient" setting time (measured by a dulling of sheen over the surface of the material) and "final" setting time (measured by scratching the surface of the material with a thin piece of plastic). The coated pieces were then observed and tested for taste, waxy feel, waxy residue in the mouth, melting point, color, and gloss or sheen.

In all instances coatings made from hard butter made in accordance with the present process had taste characteristics at least as favorable as those made by the conventional random rearrangement process and the setting time, both incipient and final, was quicker. This proved to be true, not only with the particular coating described above, but with other coatings.

Set forth hereafter are examples illustrating the present invention.

Example 1

Six samples of a mixture of 900 grams of palm kernel oil and 100 grams of cottonseed oil were hydrogenated to a 0.4 I.V. and then molecularly rearranged at different pressures with 0.4% sodium methylate catalyst at 190 to 195° F. for 2 hours with nitrogen sweeping. The catalyst was then diactivated by the addition of water and carbon dioxide, the water and soap were allowed to settle, the water and soap were then drained, and the fat (hard butter) dried and deodorized in a conventional manner. A coating was then made of each hard butter sample and the setting times compared. The pressure during rearrangement was atmospheric for the first sample, 200 mm. Hg abs. for the second sample, 100 mm. Hg abs. for the third sample, 50 mm. Hg abs. for the fourth sample, 20 mm. Hg. abs. for the fifth sample, and 10 mm. Hg abs. for the sixth sample. With those coatings made from hard butters which had been rearranged at atmospheric pressure, 200 mm. Hg abs., 100 mm. Hg abs., and 50 mm. Hg abs. the incipient setting time in each instance was aproximately 1¼ minutes and the final setting time approximately 2 minutes. At rearrangement pressures of 20 mm. Hg abs. and below the incipient setting time was approximately 1 minute and the final setting time 1½ minutes or about a 25% reduction in setting time.

Example 2

This example shows the effect of time of rearrangement on the process. Here four different samples of the same hydrogenated blend as used in Example 1 were molecularly rearranged at 10 mm. Hg abs. at the same temperature, the catalyst killed, and the hard butter recovered in the same manner as in Example 1. One of these samples was rearranged for 10 minutes, the second for 20 minutes, the third for 60 minutes, and the fourth for 120 minutes and coatings made from them tested for incipient and final setting time, with the following results:

| Time in minutes for rearrangement | 120 | 60 | 20 | 10 |
|---|---|---|---|---|
| Incipient setting time in minutes | 1 | 1¾ | 2¼ | 2 |
| Final setting time in minutes | 1¾ | 2½ | 2¾ | 2½ |

Example 3

Samples of plam kernel oil were subjected to separate modification at pressures of atmospheric, 100 mm. Hg abs., 50 mm. Hg abs., 20 mm. Hg abs., and 10 mm. Hg abs. respectively with 0.4% sodium methylate catalyst, at 230° F. for two hours with nitrogen sweeping. The catalyst in each instance was killed with carbon dioxide and water and the fat recovered as in Example 1 and then essentially completely hydrogenated. Set forth below is a comparison of the incipient and final setting times of coatings made by each such process.

| Pressure of mm. Hg abs. during rearrangement | 760 | 100 | 50 | 20 | 10 |
|---|---|---|---|---|---|
| Incipient setting time in minutes | 2½ | 2¼ | 2¼ | 1¾ | 1¾ |
| Final setting time in minutes | 3 | 2¾ | 2¾ | 2½ | 2¼ |

Example 4

Two samples of a blend of 50% kernel oil and 50% cottonseed oil were rearranged at 230° F. for two hours with 0.4% sodium methylate catalyst and nitrogen agitation and thereafter the catalyst was killed and the hard butter recovered as in Example 1. One sample was rearranged at 100 mm. Hg abs. and the other at 10 mm. Hg abs. Coatings made from the resulting hard butter had an incipient setting time and final setting time of 2¾ and 3¼ minutes respectively for the sample rearranged at 100 mm. pressure and 1 and 2 minutes respectively for the sample rearranged at 10 mm. pressure.

Example 5

Two samples of a blend of 50% coconut oil and 50% cottoneed oil were made into hard butter under the same conditions as in Example 4 and coatings made from them. Coating from the sample rearranged at 100 mm. pressure had an incipient setting time and final setting time of 2¼ and 4 minutes respectivesly while coating from the sample rearranged at 10 mm. pressure had an incipient setting time and final setting time of 2 minutes and 3½ minutes respectively.

Example 6

This example shows the use of an acid in deactivating a metal methylate catalyst. A blend of 90% refined palm kernel oil and 10% refined and bleached cottonseed oil were rearranged at 235° F. with 0.4% sodium methylate catalyst under 10 mm. Hg abs. pressure. The rearrangement was allowed to continue for 1 hour at 235° F. and then cooled to 180° F. 85% phosphoric acid in a stoichiometric amount was added to react with the catalyst to form dihydrogen phosphate salt and methanol. After the acid was added the reaction mass was allowed to remain in a quiescent state for 1 hour under atmospheric conditions. Filtration was attempted and found to be difficult. The salt content of the filtrate was found to be 736 parts per million which is entirely unacceptable. The salt was present in the filtrate because the dihydrogen phosphate salt was formed in the soluble hydrated form.

Another sample of this same blend was modified under approximately the same conditions for a period of 2 hours and the reaction terminated by the addition of a stoichiometric amount of 85% phosphoric acid at 230° F. while the rearrangement mixture was still at 10 mm. Hg abs. The blend was kept at 230° F. and 10 mm. Hg abs. for 30 minutes. At the end of this period the mass was cooled to 180° F. and then filtered with 1% filter aid of diatomaceous earth. The filtered product did not have an ash content indicating that the phosphate salts were present in the anhydrous form and were therefore insoluble and filterable.

Example 7

500 grams of unhardened coconut oil and 75 grams of commercial methyl stearate were reacted with 1.3 grams of sodium methoxide for 1 hour at 180± 5° F. at a pressure of 15 to 20 mm. Hg abs., the catalyst killed and the hard butter recovered as in Example 1. The hard butter produced by this example gives a coating having an incipient and final setting time less than that of a coating made from a hard fat made under an identical process except with rearrangement pressures in excess of about 50 mm. Hg abs.

From the foregoing discussion, examples, and description of the invention, it is apparent that the objects set forth herein as well as others have been achieved. Accordingly, the invention is to be limited only by the spirit and scope of the appended claims.

What is claimed is:

1. In the process of preparing hard butter from an edible oil containing at least about 50% lauric type oil and in which process (a) the oil is rearranged while being maintained at a temperature above that at which any solids form and with a small amount of low temperature rearrangement catalyst under molecular rearrangement conditions favorable to said catalyst, (b) the catalyst is thereafter inactivated, and (c) the treated oil is recovered, the improvement comprising:

(A) Using an oil selected from the group consisting of (i) lauric type oil, (ii) a mixture of lauric and non-lauric type oil, (iii) a mixture of a lauric type oil and methyl ester of a non-lauric type oil, (iv) a mixture of a lauric type oil and methyl ester of myristic acid, (v) a mixture of lauric type oil and methyl ester of palmitic acid, and (vi) a mixture of lauric type oil and methyl ester of stearic acid, and
   (B) Conducting the rearrangement at temperatures below about 240° F. at a pressure less than about 50 mm. Hg abs. for a time in excess of 30 minutes.

2. The process of claim 1 in which the oil selected comprises lauric type oil.

3. The process of claim 1 in which the oil selected comprises a mixture of lauric and non-lauric type oils.

4. The process of claim 1 in which the oil selected comprises a mixture of lauric type oil and a methyl ester of a non-lauric type oil.

5. The process of claim 1 in which the oil selected comprises a mixture of a lauric type oil and a methyl ester of the group consisting of myristic acid, palmitic acid, and stearic acid.

6. In the process of preparing hard butter from an edible oil containing at least about 50% lauric type oil and in which process (a) the oil is rearranged while being maintained at a temperature above that at which any solids form and with a small amount of low temperature rearrangement catalyst under molecular rearrangement conditions favorable to said catalyst, (b) the catalyst is thereafter inactivated, and (c) the treated oil is recovered; the improvement comprising:

(A) Using an oil selected from the group consisting of (i) lauric type oil, (ii) a mixture of lauric and non-lauric type oil, (iii) a mixture of lauric type oil and methyl ester of a non-lauric type oil, (iv) a mixture of lauric type oil and methyl ester of myristic acid (v) a mixture of a lauric type oil and methyl ester of palmitic acid, and (vi) a mixture of a lauric type oil and methyl ester of stearic acid, and
   (B) Conducting the rearrangement at temperatures below about 240° F. at a pressure of less than about 20 mm. Hg abs. for a time in excess of 30 minutes.

7. The process of claim 6 in which the oil selected comprises lauric type oil.

8. The process of claim 6 in which the oil selected comprises a mixture of lauric and non-lauric type oils.

9. The process of claim 6 in which the oil selected comprises a mixture of a lauric type oil and a methyl ester of a non-lauric type oil.

10. The process of claim 6 in which the oil selected comprises a mixture of a lauric type oil and a methyl ester of the group consisting of myristic acid, palmitic acid, and stearic acid.

11. In the process of preparing hard butter from an edible oil containing at least about 50% lauric type oil and in which process (a) the oil is rearranged while being maintained at a temperature above that at which any solids form and with a small amount of metal methylate catalyst under molecular rearrangement conditions favorable to said catalyst, (b) the catalyst is thereafter inactivated, and (c) the treated oil is recovered, the improvement comprising:

(A) Using an oil selected from the group consisting of (i) lauric type oil, (ii) a mixture of lauric and non-lauric type oil, (iii) a mixture of lauric type oil and methyl ester of non-lauric type oil, (iv) a mixture of lauric type oil and methyl ester of myristic acid, (v) a mixture of lauric type oil and methyl ester of palmitic acid, and (vi) a mixture of lauric type oil and methyl ester of stearic acid, (B) Conducting the treatment at temperatures below about 240° F. at a pressure less than about 50 mm. Hg abs. for a time in excess of 30 minutes,
(C) Deactivating the catalyst by the addition of an acid to the oil while such oil is under such conditions of temperature and pressure that an anhydrous salt of the catalyst and acid is formed, and
(D) Removing the anhydrous salt by filtration.

12. The process of claim 11 in which the oil selected comprises lauric type oil.

13. The process of claim 11 in which the oil selected comprises a mixture of lauric and non-lauric type oils.

14. The process of claim 11 in which the oil selected comprises a mixture of a lauric type oil and a methyl ester of a non-lauric type oil.

15. The process of claim 11 in which the oil selected comprises a mixture of a lauric type oil and a methyl ester of the group consisting of myristic acid, palmitic acid, and stearic acid.

16. The process of claim 11 in which the acid is phosphoric acid.

17. In the process of preparing hard butter from an edible oil containing at least about 50% lauric type oil and in which process (a) the oil is rearranged while being maintained at a temperature above that at which any solids form and with a small amount of metal methylate catalyst under molecular rearrangement conditions favorable to said catalyst, (b) the catalyst is thereafter inactivated, and (c) the treated oil is recovered, the improvement comprising:

(A) Using an oil selected from the group consisting of (i) lauric type oil, (ii) a mixture of lauric and non-lauric type oil, (iii) a mixture of lauric type oil and methyl ester of non-lauric type oil, (iv) a mixture of lauric type oil and methyl ester of myristic acid, (v) a mixture of lauric type oil and methyl ester of palmitic acid, and (vi) a mixture of lauric type oil and methyl ester of stearic acid,
(B) Conducting the treatment at temperatures below about 240° F. at a pressure less than about 20 mm. Hg abs. for a time in excess of 30 minutes,
(C) Deactivating the catalyst by the addition of an acid to the oil while such oil is under such conditions of temperature and pressure that an anhydrous salt of the catalyst and acid is formed, and
(D) Removing the anhydrous salt by filtration.

18. The process of claim 17 in which the acid is phosphoric acid.

References Cited

UNITED STATES PATENTS

| 2,783,151 | 2/1957 | Cochran et al. | 99—118 |
| 1,744,596 | 1/1930 | Van Loon | 260—410.7 |
| 2,726,158 | 12/1955 | Cochran et al. | 99—118 |

OTHER REFERENCES

Bailey, A. H.: "Industrial Oil and Fat Products," 1951, Interscience Publ., Inc., N.Y., p. 838 relied on.

MAURICE W. GREENSTEIN, *Primary Examiner.*